(12) United States Patent
Gamillo et al.

(10) Patent No.: US 8,586,118 B1
(45) Date of Patent: Nov. 19, 2013

(54) METHOD OF USING A GRAVITY WHEEL DE-STEMMER

(75) Inventors: Eduardo Marcos Gamillo, Las Cruces, NM (US); Ryan Patrick Herbon, Silver City, NM (US); Dale Evan Cillessen, Tolar, TX (US)

(73) Assignee: Gene Baca, Albuquerque, NM (US)

(*) Notice: Subject to any disclaimer, the term of this patent is extended or adjusted under 35 U.S.C. 154(b) by 258 days.

(21) Appl. No.: 12/931,483

(22) Filed: Feb. 2, 2011

Related U.S. Application Data

(60) Provisional application No. 61/337,319, filed on Feb. 2, 2010.

(51) Int. Cl.
*A23L 1/36* (2006.01)

(52) U.S. Cl.
USPC .......................................... 426/484; 426/231

(58) Field of Classification Search
USPC .................................. 426/484, 231
See application file for complete search history.

(56) References Cited

U.S. PATENT DOCUMENTS

| | | | | |
|---|---|---|---|---|
| 1,463,114 A | * | 7/1923 | Bostrom | 99/544 |
| 2,056,413 A | * | 10/1936 | Thompson et al. | 99/543 |
| 2,139,704 A | * | 12/1938 | Thompson et al. | 99/543 |
| 2,180,567 A | * | 11/1939 | Urschel | 99/640 |
| 2,194,058 A | * | 3/1940 | Urschel | 99/639 |
| 2,318,805 A | * | 5/1943 | Silva | 99/639 |
| 2,343,098 A | * | 2/1944 | Thompson | 99/563 |
| 2,526,712 A | * | 10/1950 | Thompson | 99/515 |
| 2,621,690 A | * | 12/1952 | Urschel | 99/639 |
| 2,688,993 A | * | 9/1954 | White | 99/544 |
| 2,835,294 A | * | 5/1958 | Rigney | 99/544 |
| 3,738,257 A | * | 6/1973 | Manfre et al. | 99/547 |
| 3,760,665 A | * | 9/1973 | Vadas | 83/872 |
| 3,818,788 A | * | 6/1974 | Vadas | 83/872 |
| 3,820,450 A | * | 6/1974 | Rasmussen et al. | 99/643 |
| 3,896,243 A | * | 7/1975 | Vadas | 426/482 |
| 4,337,693 A | * | 7/1982 | Dandrea | 99/491 |
| 4,472,444 A | * | 9/1984 | Studer et al. | 426/484 |
| 5,390,590 A | * | 2/1995 | Mendenhall | 99/537 |
| 5,492,717 A | * | 2/1996 | Paterson et al. | 426/665 |
| 5,787,801 A | * | 8/1998 | Kirk et al. | 99/541 |
| D610,884 S | * | 3/2010 | Rabanal | D7/693 |
| 7,739,949 B2 | * | 6/2010 | Justesen et al. | 99/547 |
| 7,887,865 B2 | * | 2/2011 | Knorr et al. | 426/484 |
| 8,127,668 B2 | * | 3/2012 | Snyder et al. | 99/636 |
| 2008/0289515 A1 | * | 11/2008 | Knorr et al. | 99/640 |

FOREIGN PATENT DOCUMENTS

| | | | |
|---|---|---|---|
| SU | 268784 | * | 11/1968 |
| SU | 530673 | * | 12/1974 |

* cited by examiner

*Primary Examiner* — Anthony Weier
(74) *Attorney, Agent, or Firm* — Jeffrey Roddy

(57) ABSTRACT

A produce de-stemmer for generally symmetrical produce such as pepper pods that supports an item of produce in a propped orientation within a canister, a number of which are connected to a moving endless chain so that the canisters are cyclically inverted. A fixed support track resides below the moving canisters to support the item of produce so that a portion of the item is exposed during the canister travel. The exposed portion of the produce item is propelled into a cutting means which removes a desired portion of the produce item.

1 Claim, 6 Drawing Sheets

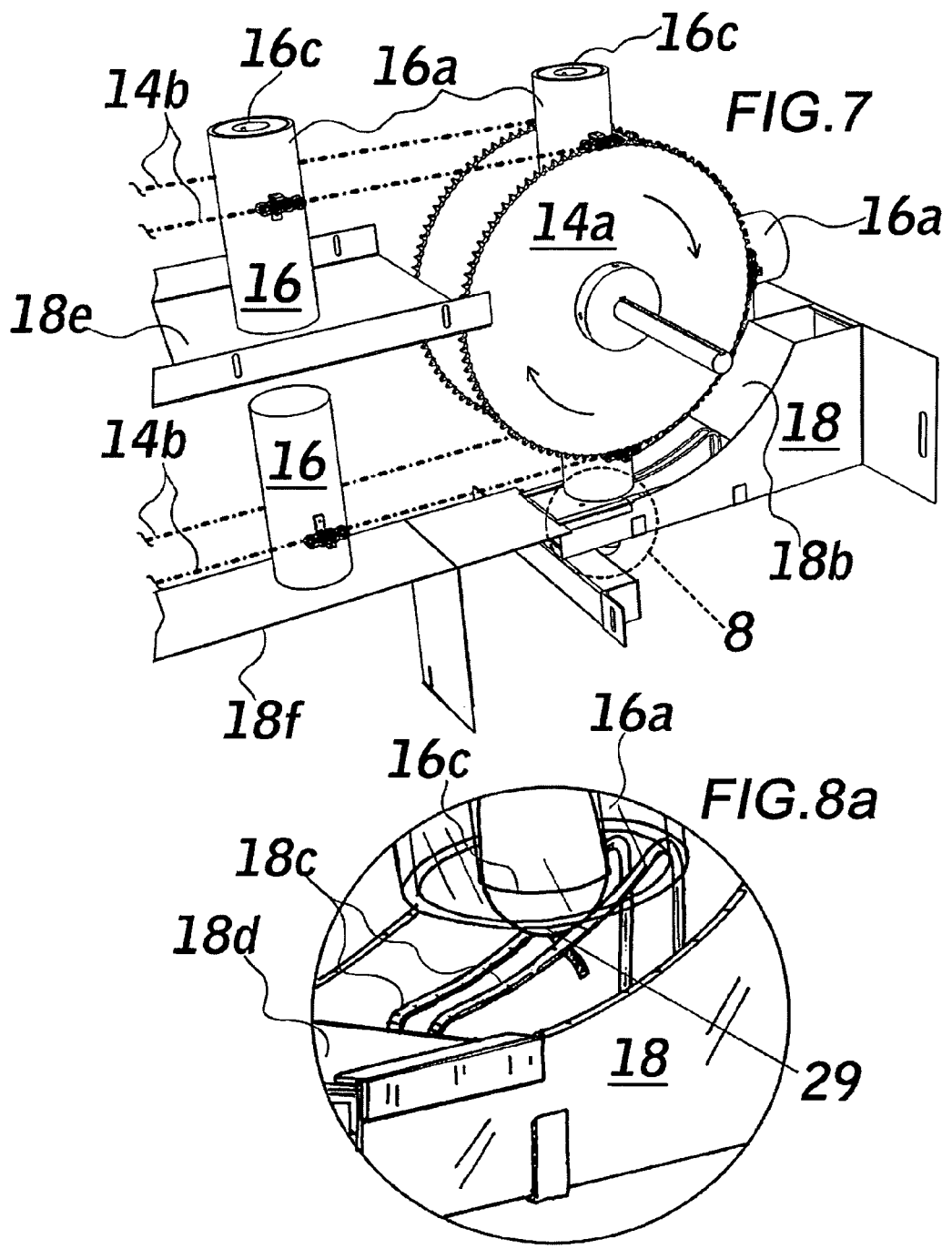

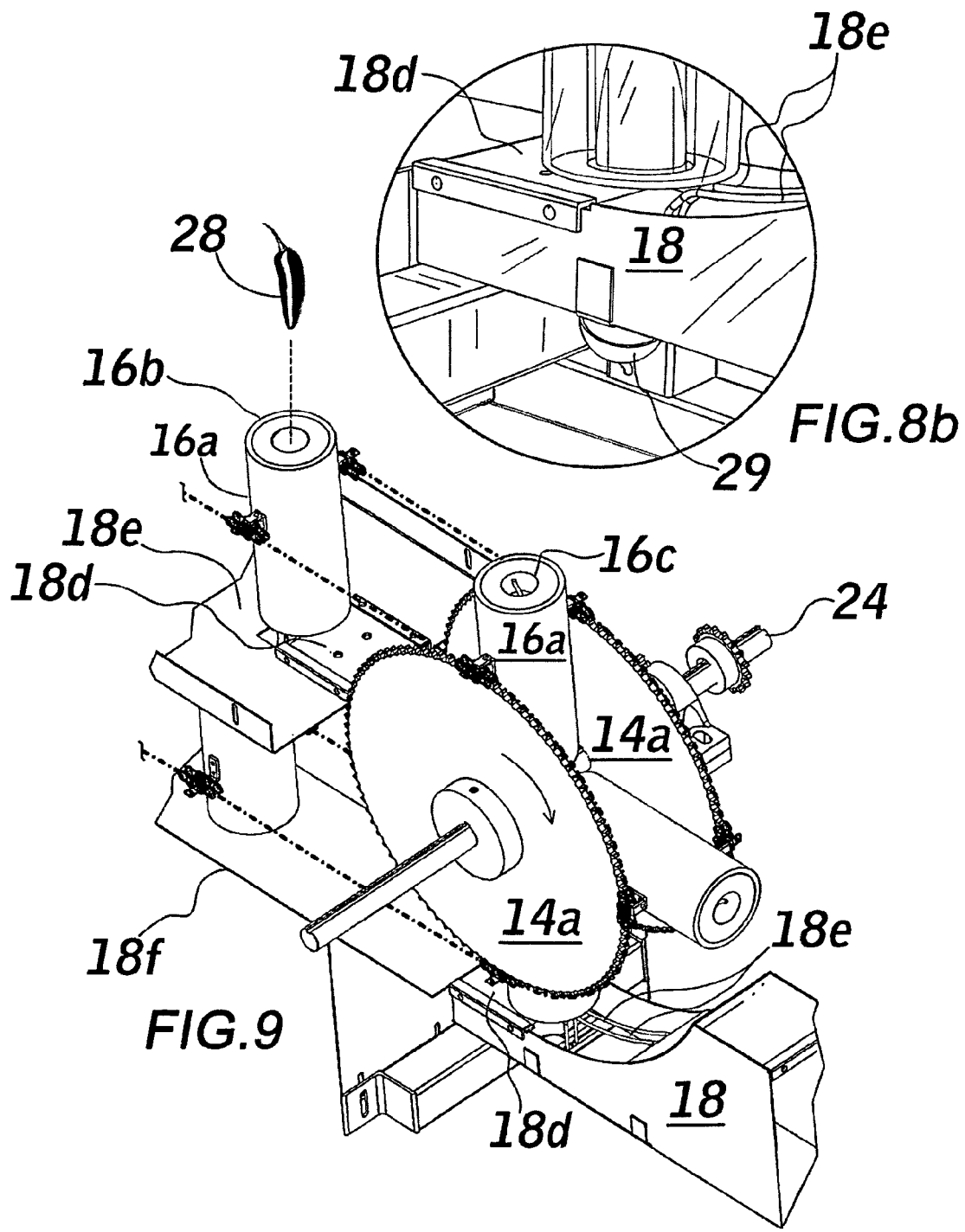

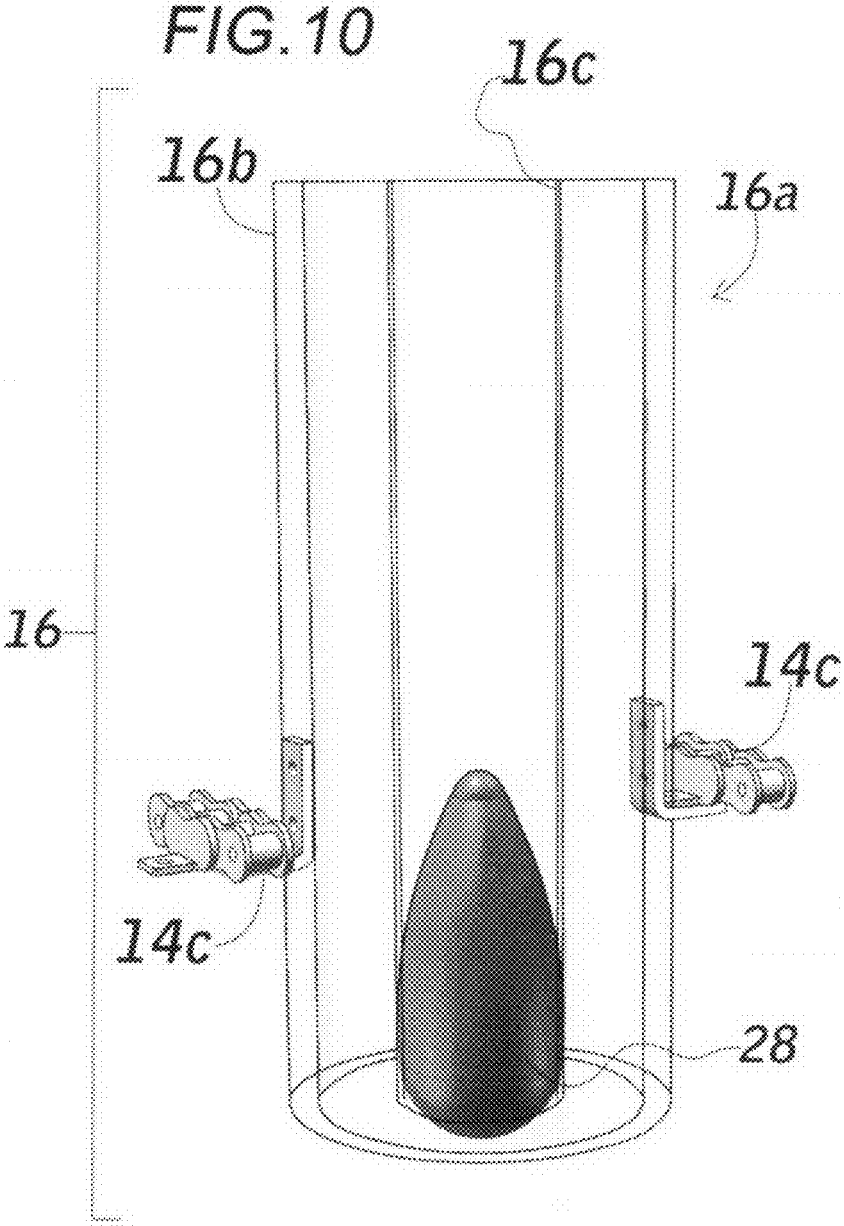

METHOD OF USING A GRAVITY WHEEL DE-STEMMER

CROSS REFERENCE TO RELATED APPLICATIONS

This Application claims the benefit of Provisional Patent Application No. 61/337,319 filed Feb. 2, 2010

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATION-BY-REFERENCE OF MATERIAL SUBMITTED ON A COMPACT DISC

Not applicable

DESCRIPTION OF THE PRIOR ART

Although mechanical harvesting has made inroads in the pepper growing industry, hand harvesting still accounts for 40-60 percent of a growers production cost. Mechanical harvesters are expensive and have met resistance due to cost. One of the more time consuming tasks for pepper growers is to de-stem the pods. Although a variety of trimmers have been proposed which feature containers for holding a single item of produce, most are mechanically complicated and include aspects such as vibration or pressurized air in order to seat the item or to trim the ends.

SUMMARY OF THE INVENTION

1. Objectives of the Invention

It would be desirable if a trimmer/de-stemmer could perform the trimming operation using substantially only gravity, a fixed means, a static guiding means and a static retention means. Such an apparatus would possess relatively few moving parts, would be particularly simple to operate and maintain, and result in decreased energy consumption compared to past machines. An apparatus for de-stemming produce possessing the foregoing aspects would compliment both mechanical harvesting or hand harvesting and would allow for rapid ROI.

It would also be desirable if an operator of such a trimming apparatus could readily alternate between cap trimming and tip trimming of an item of produce.

It would be especially desirable if such an apparatus could be entirely powered with a single rotary prime mover of the operator's choosing.

2. Statement of the Invention

The trimming/de-stemming apparatus disclosed herein uses a series of produce receivers, a guiding means, and gravity to position relatively symmetrical items of produce such as a pepper pods into the path of a cutting means for trimming either the cap, tip or both ends of the pod. The preferred embodiment possesses four sprockets which are logically divided into two co-planar pairs. Each co-planar sprocket-pair supports an endless chain. The co-planar pairs mirror each other such that each sprocket of the co-planar pair is coaxial with a sprocket of the adjacent pair defining a co-axial sprocket-pair which is driven in tandem. The endless chains about the sprockets are thus aligned and synchronized in movement resulting in two parallel endless chains co-travelling about the sprockets.

A regular series of canisters are connected to, and between adjacent chain segments by a bracketing means. The canisters co-travel with the chains about the sprockets and cyclically assume an alternating upright and inverted orientation. Each canister has a receiver with an opening, an internal surface, and either a closed or open end. During travel each receiver passively supports a produce item longitudinally in a propped state within the canister.

When preparing for the de-stemming operation, the pods are placed with the stems (cap end), pointing up into the receivers. The canisters then co-travel with the parallel chains in one direction until they loop about a coaxial pair of sprockets at one end of the de-stemmer inverting the canister. At the point of inversion, the canister, now traveling in the opposite direction, is propelled into a cutting means. During inversion the pods begin to slide downward, but are prevented from falling completely free of the receivers by a curved support surface 18b positioned below the sprockets and the inverted canisters. The curved surface conforms to an arc which is slightly greater than the radial path of the traveling canister as it moves over the sprockets and transitions from an upright position to an intermediate horizontal position, and then to a fully inverted position. The curved surface terminates into a pair of guide rods 18c which are positioned just below the inverted receivers so as to catch and slidably cradle the now exposed cap of the pod. The pair of guide rods guides the cap of the pod into a cutter, as exemplified by a fixed height blade 18d which is set at a predetermined height for the selective removal of a desired amount of stem section. After trimming, the peppers are prevented from immediately falling free of the canisters by a generally horizontal produce track 18f which supports the now truncated portion of the moving pod and terminates just above a collection bin, at which point the unsupported pods are permitted to fall into the bin. Alternately, the tip ends of pods may be removed by (1) by attaching a first blade to the upper produce track 18e whereby peppers that are loaded tip down into the canisters having a tubular receiver which is open at both ends drop to the bottom of the receiver an contact the track 18e which supports the peppers while they are driven along the path. The peppers are partially exposed at the tips because of the distance between the track and the ends of the receivers and are swept across the blade for de-tipping. The canisters then round the sprocket pair and invert to expose the cap end of the pod which is then driven into a second blade, or (2) in a single blade configuration, simply making two passes; once with the peppers loaded tip down and then re-loading the peppers tip up for a second pass.

Loading pepper pods into the canisters for trimming; e.g., tip cutting or de-stemming, is accomplished manually or by a mechanical feeder (not shown).

For a further understanding of the nature and objectives of the present invention, reference should be made to the following detailed description, taken in conjunction with the accompanying drawings, in which like elements are given the same or analogous reference numbers.

BRIEF DESCRIPTION OF THE PREFERRED EMBODIMENT

FIG. 7 is a partial perspective view of one side of the apparatus showing the position of a coaxial sprocket pair relative to the cutter subassembly 18 in accordance with the present invention;

Figure 1:
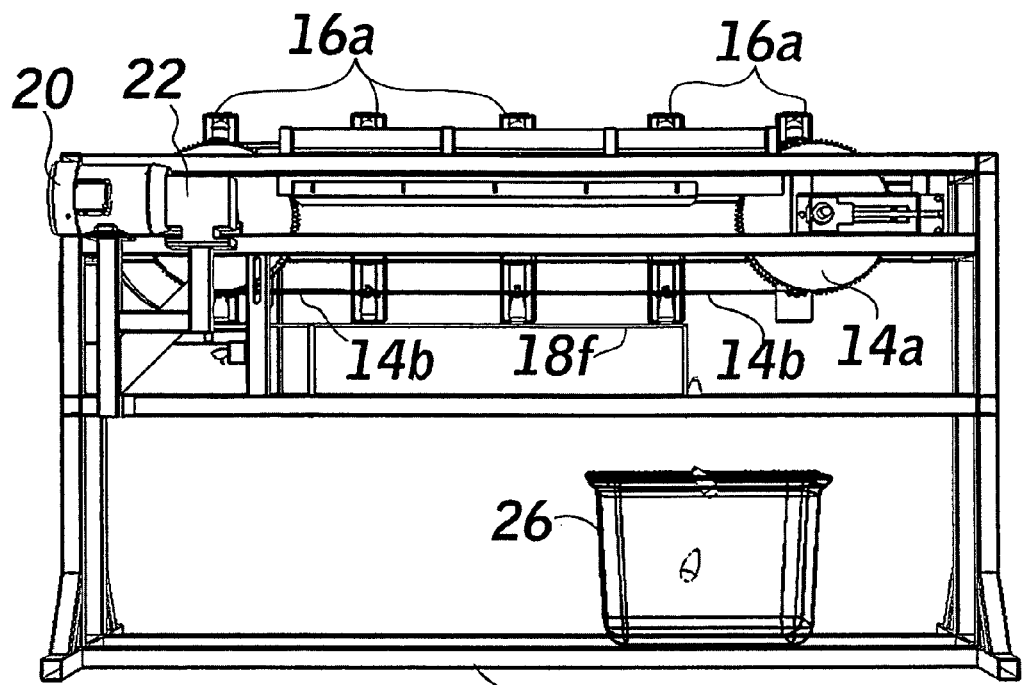
FIG. 1 is side elevation of a preferred embodiment according the present invention.
Figure 2:
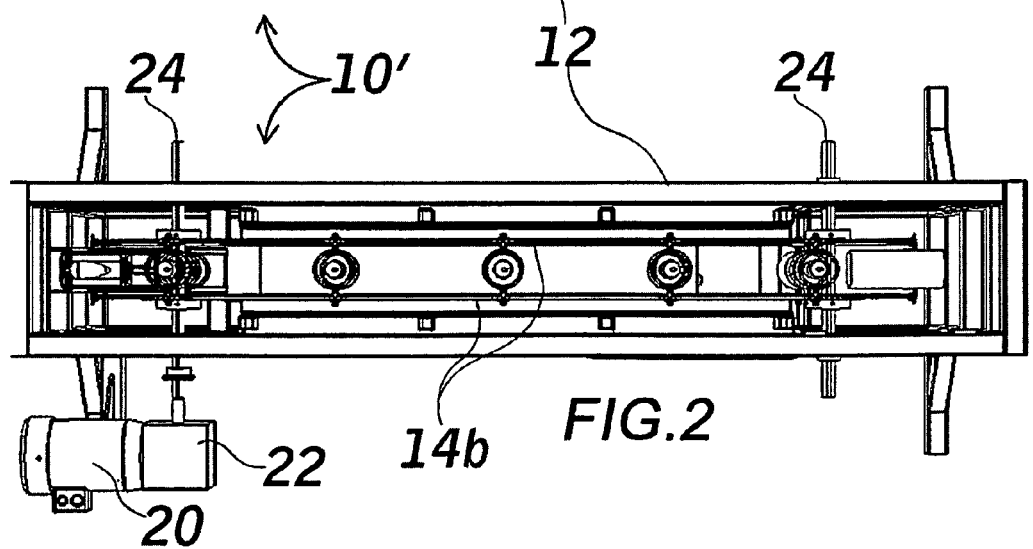
FIG. 2 is a top view of a preferred embodiment according the present invention.

FIG. 8a is a first detail view of element 8 of (FIG. 7) showing a pepper cap 29 being supported by guide rods 18c;

FIG. 8b is a second detail view of element 8 of (FIG. 7) showing a pepper after contact with cutter 18d having been de-capped;

FIG. 9 is a partial perspective view of one embodiment according to the present invention having a second cutter mounted to the uppermost produce track 18e;

FIG. 10 is a detail view of a canister subassembly 16 of the preferred embodiment according to the present invention.

DESCRIPTION OF THE PREFERRED EMBODIMENT

3. Reference Listing

Figure 3:
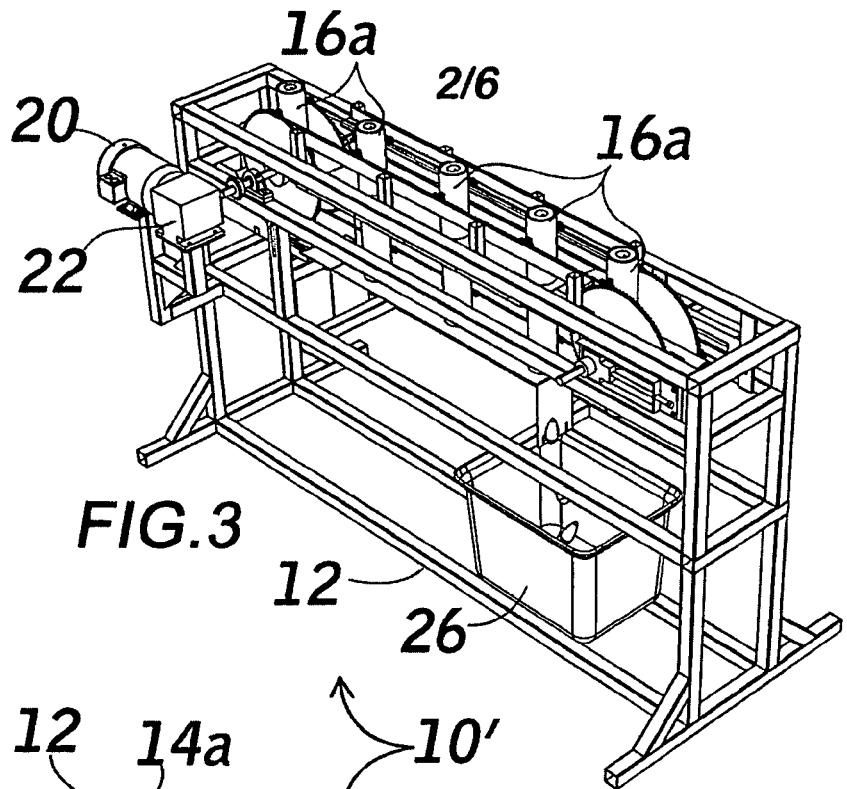
FIG. 3 is a perspective view of one side of the preferred embodiment.
Figure 4:
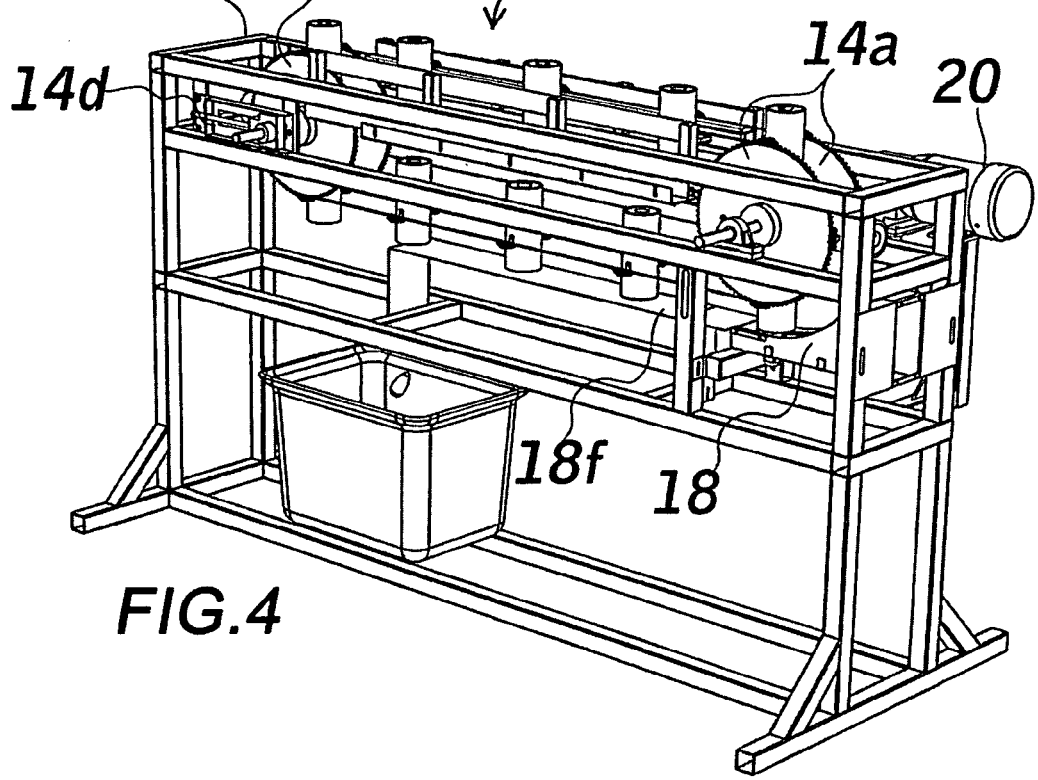
FIG. 4 is a perspective view of the obverse of (FIG. 3)
Figure 5:
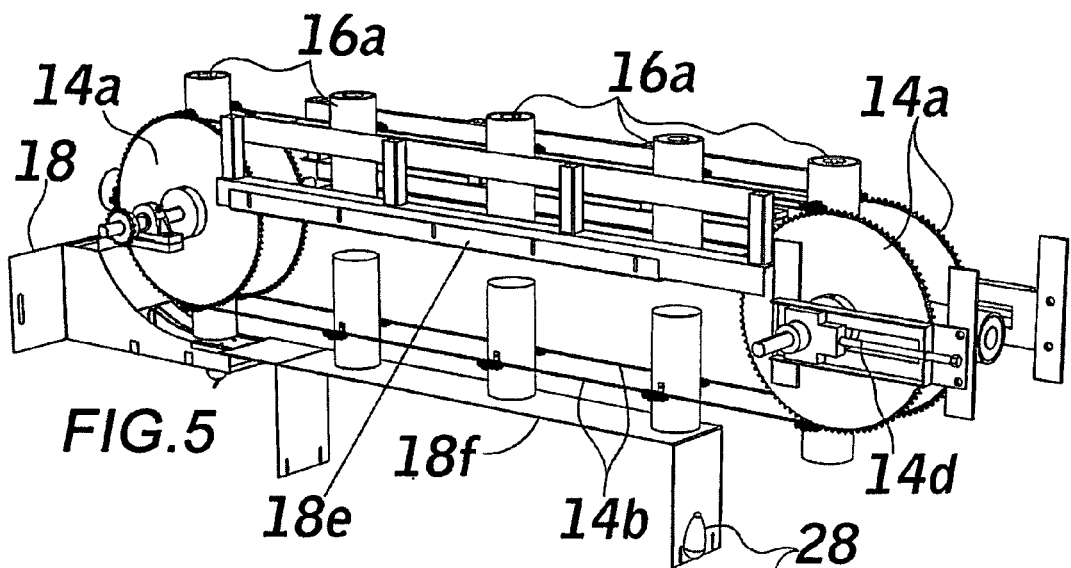
FIG. 5 is perspective view of the preferred embodiment excluding the frame subassembly.

10' de-stemmer assembly
12 frame subassembly
14 sprocket and chain subassembly
14a sprocket
14b endless chain
14c chain segment
14d chain tensioner
16 canister subassembly
16a canister
16b canister outer shell
16c tubular receiver
16d bracket connectors
18 cutter subassembly
18a cutter support frame
18b curved produce support
18c guide rods
18d blade
18e upper produce track
18f lower produce track
20 motor
22 transmission means
24 axle
26 collection bins
28 pepper pod
29 pepper cap Referring generally to FIGS. 1-10, a preferred embodiment of an apparatus for de-stemming and trimming the ends of relatively symmetrical produce such as green and red chilies is described. FIGS. 3 and 4 are perspective views of the apparatus taken from opposite sides and show at least a frame subassembly 12, a pair of chain and sprocket subassemblies 14, a powering means 20, a cutter subassembly 18 and a collection and separation means 26. FIG. 5 is a partial view excluding the frame 12 in order to preferentially depict the sprocket and chain subassemblies 14, the canister subassemblies 16 and the cutter subassembly 18. The endless chains 14b of the apparatus are continuous about the sprockets and without breaks. Regarding figures depicting continuous chains; for purposes of conciseness and clarity only those chain segments representing the connection point of the outer shells of the canisters 16a to the endless chains are depicted, with the remainder of the endless chains indicated by a dashed line in order to provide an unobstructed view of the workings of the apparatus.

Each chain and sprocket subassembly 14 has a endless chain 14b wound about and tensionably held between two co-planar sprockets 14a. The chain and sprocket subassemblies 14 are positioned parallel to one another with an axle 24 passing through the coaxial sprocket pairs which are driven in tandem. At least one of the axles is connected to a prime mover 20 and depicted herein as an electric motor, but which can be an internal or external combustion engine or any other suitable engine. Although the speed regulation means between the motor and the axle is shown as a transmission with reduction gear 22, other means of controlling speed such as a series of stepped pulleys by which speed may be increased or decreased, or speed regulation means via voltage regulation of an electric motor can be used.

A series of regularly spaced canisters 16a affixed between the parallel chains 14b by a pair if brackets connectors 16d, in which each bracket is attached at one end to a side of the canister's outer shell 16b and at the other end to a bush roller portion of a chain segment 14c. The chain segments of the sprocket and chain subassemblies are aligned so that each link of the endless chain on one subassembly mirrors a corresponding link on the other subassembly defining a link pair. The brackets transversely couple each canister between link pairs and the canisters co-travel with the moving chains. Each canister possesses a tubular receiver 16b which has at least one open end and can be closed or open at the opposite end for purposes of loosely supporting a produce item in a propped position relative to the receiver.

Referring to FIGS. 5 and 7, two produce tracks; upper 18e, and lower 18f, are mounted at a pre-determined distance from the bottoms of the canisters irrespective of canister orientation, in order to support exposed portions of a produce item; i.e., that portion of the produce item not encircled by the tubular receiver.

Figure 6:
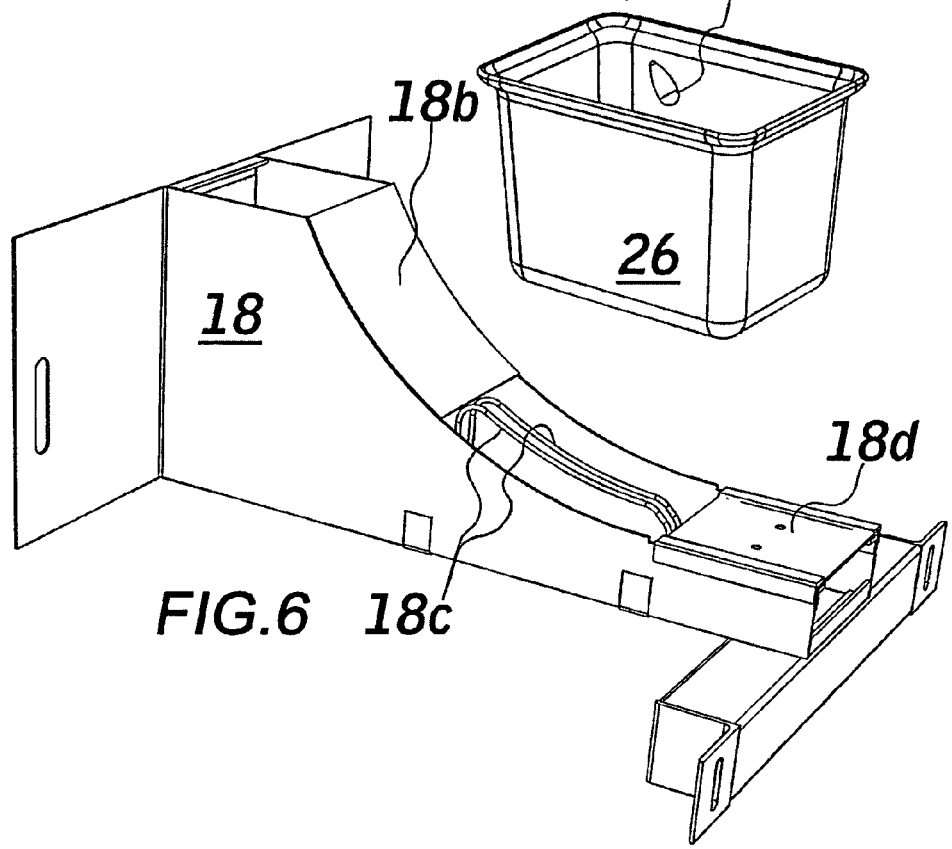
FIG. 6 is a detail perspective view of the cutter subassembly 18.

FIG. 6 is an isolated view of the cutter subassembly 18 with a curved produce support 18b, a pair of guide rods 18c and a cutter 18d.

FIG. 7 depicts the relationship between the cutter subassembly 18 and a coaxial sprocket pair. As each canister 16a travels with a corresponding link pair, it passes up and over the coaxial sprocket pair and is supported in an inverted position by curved produce support 18b and proceeds toward a blade 18d.

FIGS. 8a and 8b are detail views of 8 (FIG. 2), and depict respectively, (1) a partially exposed pepper cap 29 supported by the guide rods 18c which permit the stem portion of the pod to drop partially between the rods and (2) the inverted canister 16a having propelled the supported and exposed pepper cap 29 into the sharpened edge of the blade 18d which has been adjusted to a desired height to remove the desired amount of cap including the stem.

FIG. 9 is a partial view of the de-stemmer having cutter 18d mounted to top produce track 18e. Peppers 28 placed in the tubular receivers 16c drop to the bottom of the receiver where the tips are supported by produce track 18e and propelled into the blade. After de-tipping, the canisters are driven over the sprocket pair and inverted causing the peppers to fall cap down toward the curved produce support 18b which initially supports the pepper until the cap is cradled by the guide rods 18c.

The amount of cap or tip removed in the cutting operation depends on the distance between the guide rods and the top of the cutter's edge, and may be adjusted by raising or lowering the guide rods, widening the space between the guide rods, or raising or lowering the blade height which may be adjusted by machine screws, shims, (not shown) or other common means.

FIG. 10 is an isolated depiction of a canister subassembly 16. The opening of the receiver 16c may be a tubular construction open at both ends, a tubular construction closed at one end and having annular flanges at opposing ends resembling a spool which is fitted inside the cylindrical shell of the canister, or any tubular construction capable of unconstrained support of the pod in an propped longitudinal position. It is also conceivable that the canisters may contain flexing members constructed of a material such as Delrin having a generally low coefficient of friction arranged in a finger pattern (not shown) that are biased to assume a relatively closed position, but will spread to accommodate a wide size range of pods. In any case, the examples given are not intended to limit the invention to the particular forms set forth. The basic requirement of the receivers is sizing to accommodate various diameters of pods and unconstrained support of the pods in a propped orientation allowing the pods to slip longitudinally free when the receivers are inverted.

While the foregoing disclosure has described with the examples given, at least one embodiment of the invention, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A method for removing a stem containing portion of relatively symmetrical produce items, comprising the steps of:
   (1) loading moving tubular receivers with a produce item which drops to a bottom of the receivers and is supported unconstrained and propped in longitudinal orientation relative to the receiver in which a portion of the produce item is exposed and supported by at least one support surface residing inferiorly to the receivers,
   (2) propelling the moving receivers cyclically along a path,
   (3) placing at least one cutting means below the receivers,
   (4) cycling the moving receivers which alternate between an upright and inverted position,
   (5) preventing the produce item from falling completely free of the receiver by means of a curved support surface,
   (6) guiding a portion of the produce item which is exposed by gravity; and,
   (7) directing the exposed portion of the produce item into the path of a cutter.

* * * * *